United States Patent

Ratcliff

[11] Patent Number: 5,977,509
[45] Date of Patent: Nov. 2, 1999

[54] METHOD FOR FULL PENETRATION ELECTRON BEAM WELD FOR DOWNHOLD TOOLS

[75] Inventor: John Carey Ratcliff, Missouri City, Tex.

[73] Assignee: Schlumberger Technology Corporation, Houston, Tex.

[21] Appl. No.: 09/130,250

[22] Filed: Aug. 6, 1998

[51] Int. Cl.[6] .................................................. B23K 15/04
[52] U.S. Cl. ...................................................... 219/121.14
[58] Field of Search ........................ 219/121.14, 121.13; 228/170, 171, 172, 175

[56] References Cited

U.S. PATENT DOCUMENTS

| | | | |
|---|---|---|---|
| 3,436,515 | 4/1969 | Sayer et al. | 219/121.14 |
| 3,679,862 | 7/1972 | Stoll et al. | 219/121.14 |
| 3,780,412 | 12/1973 | Millard | 219/121.14 X |
| 4,034,182 | 7/1977 | Schlosser et al. | 219/121.14 |
| 4,145,094 | 3/1979 | Vezirian | 219/121.14 X |
| 5,343,010 | 8/1994 | Urech | 219/105 X |

FOREIGN PATENT DOCUMENTS

| | | |
|---|---|---|
| 63-260685 | 10/1988 | Japan . |
| 2-55680 | 2/1990 | Japan . |
| 3-66485 | 3/1991 | Japan . |

OTHER PUBLICATIONS

Benedict, Gary F., Nontraditional Manufacturing Process 1987, Marcel Dekker, Inc., pp. 255–331.

*Primary Examiner*—Gregory Mills
*Attorney, Agent, or Firm*—John J. Ryberg; Steven L. Christian; Brigitte L. Jeffery

[57] ABSTRACT

Downhole oilfield tools often consist of complicated "blocks" that are small in diameter (typically $1^{11}/_{16}$-inch to $4^{3}/_{4}$-inch) and long (typically 2 to 10 feet). The invention describes a novel method of designing and manufacturing the "blocks" which significantly reduces the machining and manufacturing complexity of the part. After designing the "blocks" and machining them by conventional "easy access" metal-removal methods, the new manufacturing process disclosed herein uses a full penetration electron beam weld to join two "blocks" together to create a final piece that previously would have been made from a single monolithic piece requiring extremely difficult machining processes. A preferred embodiment utilizes a variable penetration welding procedure, i.e., a weld that varies the intensity of the electron beam as it is directed around the "blocks" to be welded together.

15 Claims, 3 Drawing Sheets

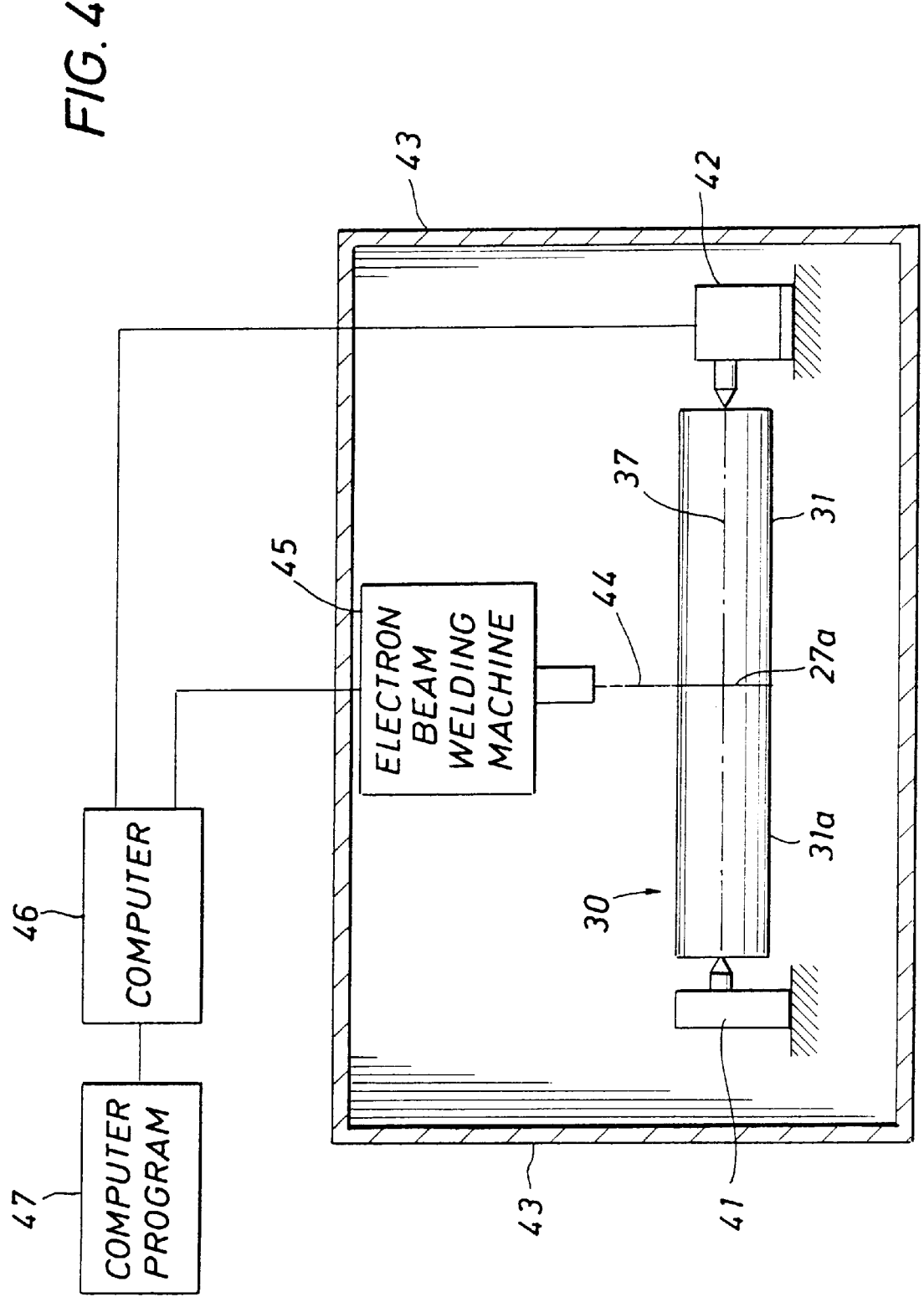

METHOD FOR FULL PENETRATION ELECTRON BEAM WELD FOR DOWNHOLD TOOLS

BACKGROUND OF THE INVENTION

1. Field of the Invention

The invention is related to electron beam welding and, in particular, to electron beam welding of downhole tools for use in oil well applications.

2. Description of the Prior Art

Downhole oilfield tools often consist of complicated "blocks" that are small in diameter and long in length. These "blocks" have previously been joined by the conventional "pin and box" joint well known to those skilled in the art. This joint is undesired since it adds several inches to the tool length.

Electron Beam Welding processes have been in use for quite some time. See, for example, Benedict, Gary F. "Nontraditional Manufacturing Processes" (1987), Chapters 18 and 19. Electron beam welding is a fusion welding process in which heating results from the impingement of a beam of high velocity electrons on the metal to be welded. Originally developed for obtaining ultra-high-purity welds in reactive and refractory metals, its unique qualities have led to substantial use in numerous operations.

The electron optical system for the process starts with a high voltage current heating a tungsten filament to about 4000° F. causing it to emit high velocity electrons. By means of a control grid, accelerating anode and focusing coils, the electrons are formed into a concentrated beam and focused onto the workpiece in a spot measuring about $\frac{1}{32}$ to $\frac{1}{8}$ inch in diameter. Since electrons cannot travel well through air, the beam must be generated and focused in a very high vacuum.

In most operations, the workpiece is also enclosed in the high-vacuum chamber and must be positioned and manipulated in this vacuum. In some applications, however, it is possible to have some portion of the workpiece positioned outside the chamber if it can be sealed for vacuum purposes. High-vacuum electron beam welders are defined as those that operate with the workpiece at a pressure ranging from 0.13 to $1.3 \times 10^{-4}$ Pa ($10^{-3}$ to $10^{-6}$ torr). When welding under these conditions, the vacuum assures degasification and decontamination of the molten weld metal, and very high quality welds are obtained. Materials that are difficult to weld by other processes, such as zirconium, beryllium and tungsten, can be welded successfully by electron beam welding, but the weld configuration should be simple and preferably flat. The high power and heat concentrations can produce fusion zones with depth-to-width ratios of 25:1 with low heat input, low distortion and a very narrow heat-affected zone. Heat-sensitive materials can be welded without damage to the base metal. Additionally, high welding speeds are common, no filler material is required, the process can be performed in all positions and preheating or postheating is generally unnecessary.

The process of electron beam welding through holes was first developed by Applicant for a Slim Repeat Formation Tester project in 1992. The process was utilized to weld a tubular end onto a part which had holes originating at the intersection. (See FIGS. 1A and 1B) These holes were sealed by first installing a plug which was then electron beam welded through. In this process, however, removal of the plugs was not required. A test piece was designed to demonstrate the capabilities of this procedure and is described below with reference to FIG. 1.

SUMMARY OF THE INVENTION

Downhole oilfield tools often consist of complicated "blocks" that are small in diameter (typically $1\frac{11}{16}$-inch to $4\frac{3}{4}$-inch) and long (typically 2 to 10 feet). The invention describes a novel method of designing and manufacturing the "blocks" which significantly reduces the machining and manufacturing complexity of the part. After designing the "blocks" and machining them by conventional "easy access" metal-removal methods, the new manufacturing process disclosed herein uses a full penetration electron beam weld to join two "blocks" together to create a final piece that previously would have been made from a single monolithic piece requiring extremely difficult machining processes. A preferred embodiment utilizes a variable penetration welding procedure, i.e., a weld that varies the intensity of the electron beam as it is directed around the "blocks" to be welded together.

BRIEF DESCRIPTION OF THE DRAWINGS

FIG. 4 is a schematic of the apparatus for performing the welding process.

DESCRIPTION OF THE PREFERRED EMBODIMENTS

Figure 1A:
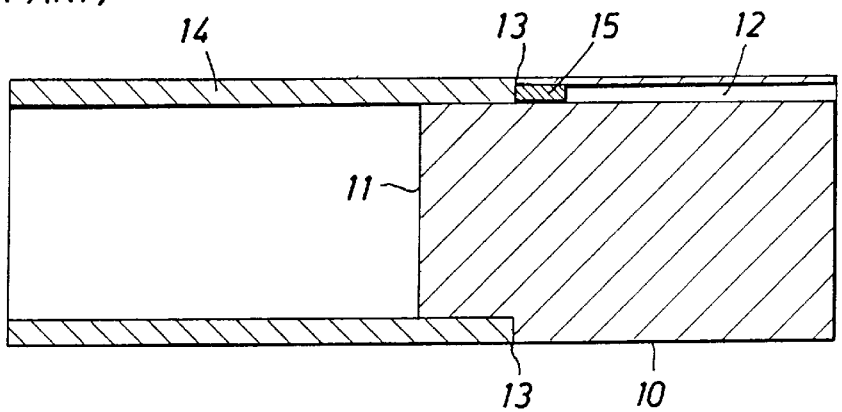
FIGS. 1A and 1B show cross-section and front elevation views, respectively, of Applicant's prior art method for joining two parts.

Downhole oilfield tools often consist of complicated "blocks" that are small in diameter (typically $1\frac{11}{16}$-inch to $4\frac{3}{4}$-inch) and long (typically 2 to 10 feet). These "blocks" have a large number of drilled holes, which may be parallel, slanted or perpendicular to the centerline, which holes are used to pass and direct wires and hydraulic fluids, as well as borehole and formation fluids, from one location in the tool to another. There may also exist a number of complex "cavities" for the placement of various control valves, connectors, gauges etc., to control the tool functionality. All of this necessitates the "block" being a very complicated part to machine via traditional metal removal processes.

The new manufacturing process disclosed herein uses a full or variable penetration electron beam weld to join two segments, or "blocks", together to create a final piece that previously would either have been made from a single monolithic piece or joined by the aforementioned "pin and box" joint.

The invention describes a novel method of designing and manufacturing the aforementioned "blocks" which significantly reduces the machining and manufacturing complexity of the part. This results in cost-savings and allows more creative designs by opening up a degree of freedom in the design stage that was heretofore not possible. After designing the "blocks" and machining them by conventional "easy access" metal-removal methods, the new manufacturing process disclosed herein uses a full penetration electron beam weld to join two segments (i.e., "blocks") together to create a final piece that previously would have been made from a single monolithic piece requiring extremely difficult machining processes. The term "full penetration" means that the finished weld can extend across the entire cross-section of the tool. This is advantageous in that a complicated part designed from two or more simple pieces will typically cost less than a unitary complicated machined part and the risk of losing the part due to a machining error is less.

The method disclosed herein involves designing a joint to be welded such that upon completion, the part will essentially replicate the monolithic block in function, external appearance and strength. The interconnection of hydraulic, wire and fluid passage holes between the two "blocks" can be accomplished by plugging them at their interface (joint) and preparing the mating surfaces properly prior to welding, as subsequently described. After tack-welding the parts to be joined, the joint is then welded using the proper machine settings, input by a computer, to allow penetration in excess of 2½ inches which will give "full penetration" for a tool approximately five inches in diameter. It is believed that the process can be used for tool diameters approaching ten inches and for materials such as titanium and 15–5 stainless steel. The parts to be joined are rotated around their centerline while the electron beam is applied to form a full penetration weld. The plugs are then drilled out after completion of the welding process to allow communication (of fluids, wiring, etc.) therethrough. This is a critical procedure since the parts must be designed such that easy access to the holes is available for conventional drilling processes after the "blocks" are welded together. The entire tool with its completely welded joint can then be machined along the outside diameter to eliminate the crown and bring the outside diameter back to size. The completed weld joint is nearly as strong as the unwelded parent material.

A preferred variation of the process uses a "variable penetration rate" in which the electron beam welding machine parameters are changed to allow deeper and/or shallower penetrations of the electron beam depending on the angular position of the cylindrical "blocks" and the depth to be welded at each angular position. This allows welding around (i.e., instead of through) any included feature, such as a cavity or a passage that may not permit straight access so as to allow drilling of a plug after welding.

The invention is useful, for example, in manufacturing long tools (say, sixty inches long) which require one or more longitudinal conduits therethrough. The method previously used required "gun drilling" each conduit for the entire sixty inches which could result in an off-axis error of 0.10 inch. By making two thirty-inch "blocks", for example, the conduits can be drilled with higher precision, then joined together by the disclosed process.

Figure 1B:
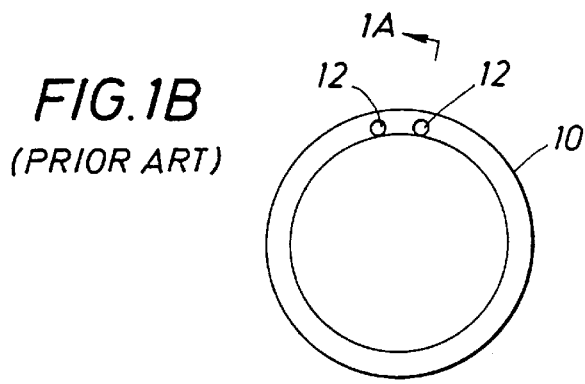

FIG. 1 shows Applicant's Prior Art method of joining two sections of a tool. This method and procedure used only partial weld penetration and did not use a full or variable penetration welding process as described for the instant invention. Additionally, the process did not require removal of the plugs after the welding process was completed. In this process, a part 10 and a mating part (not shown) have a common interface 11. The interface 11 had numerous holes (not shown) extending and communicating through part 10 and its mating part. These holes did not require plugging and subsequent drilling and were allowed to terminate at the interface 11. Part 10 also included several communication holes 12 (only one shown in FIG. 1A) ending at a shoulder 13. To connect the parts, a tubular sleeve 14 was slip-fitted onto part 10 and butted against shoulder 13. The holes 12 were first sealed by plugs 15. A cap (not shown) was placed over the other end of the sleeve 14 and axial pressure was applied e.g., by clamps, opposing axial rams, etc., between the free end of part 10 and the cap over sleeve 14 forcing part 10 into the sleeve 14 with a snug fit. The assembly was then electron beam welded circumferentially at the shoulder 13 with the weld extending through the plugs 15 and into the part 10 for a short distance but not into the holes (not shown) extending through the interface 11. Removal of plugs 15 was not required since termination of communication holes 12 at the shoulder 13 was permissible. The assembly was then completed by removing the clamping device and threading the tube 14 onto the mating part (not shown).

Figure 2A:
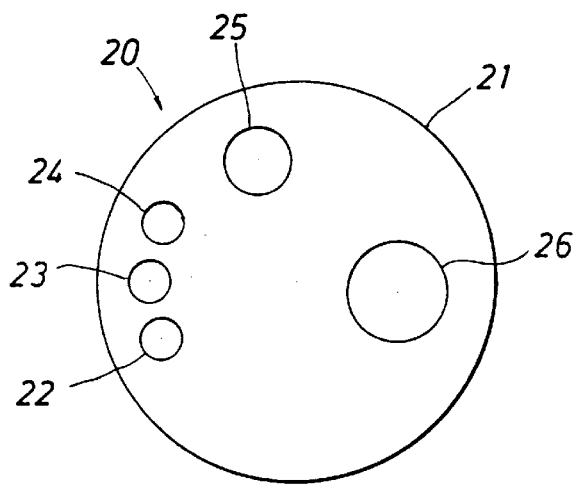
FIGS. 2A and 2B show views of a typical cross-section and front elevation, respectively, of Applicant's method according to the invention.
Figure 2B:
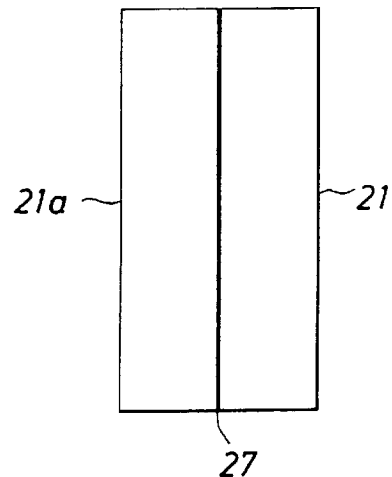

FIG. 2A is a cross-sectional view of a typical portion 21 of an oil well tool 20 for use downhole. The section includes longitudinal holes 22, 23, 24, 25 and 26 drilled therethrough. These holes are cleaned, plugged and prepared as subsequently described, then mated, as shown in FIG. 2B to a mating section 21a for welding. The two sections 21 and 21a are first clamped together and tackwelded, for example by TIG fusion welding or other conventional welding process, to "fix" their relative position and alignment. They are then placed into a vacuum chamber (see FIG. 4) for electron beam welding across the entire face of the mating surfaces, i.e., a "full penetration" weld including the plugs in holes 22, 23, 24, 25 and 26. The completed welded joint 27 is shown in FIG. 2B. Subsequently, the plugs in each of the holes 22, 23, 24, 25 and 26 are drilled out to restore communication through the holes 22, 23, 24, 25 and 26 in parts 21, 21a. This is possible because holes 22, 23, 24, 25 and 26 are easily accessible by conventional drilling tools after the welding process is completed.

Figure 3:
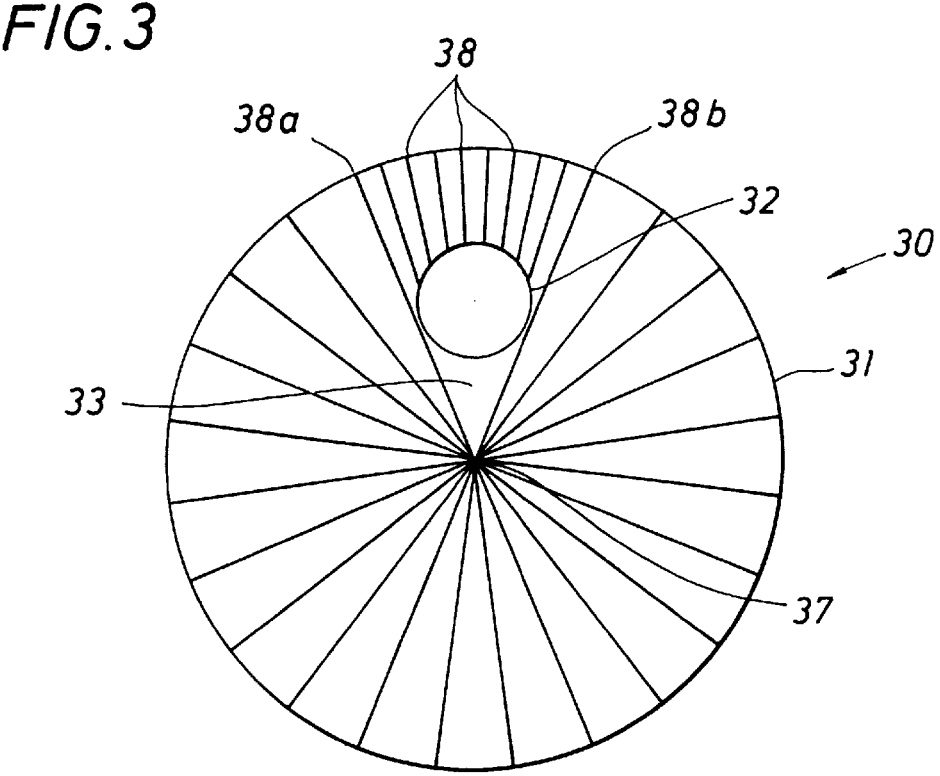
FIG. 3 shows a cross-sectional view of a typical variable penetration electron-beam welding process according to the instant invention.

Referring now to FIGS. 3 and 4, the welding process is further described for an assembly 30 having a part 31 mating with a part 31a analogous to part 21a in FIG. 2B. For simplicity of illustration, only one longitudinal hole 32 is shown. Full communication is required between sections 31 and 31a through hole 32 after welding is completed; however, in this embodiment, the hole 32 is not accessible for drilling after the sections 31 and 31a are welded together, and, therefore, a plug cannot be used. This procedure may also be used where sealing or isolation of the hole 32 is not required. This will be further explained with reference to FIG. 5. After the drilling of all desired holes (32 for example) and tack-welding the sections 31 and 31a together as described above, the tool 30 sections 31 and 31a are placed on a precision lathe-type apparatus (see FIG. 4) comprising a fixed center point 41 and a motor drive 42 for rotating the tool 30 about its longitudinal axis 37. The apparatus is enclosed in a vacuum chamber 43 which is then evacuated to the desired level. The motor 42 is driven at a desired speed, as determined by a computer program 47 which takes into account the capabilities of the welding machine 45, thus causing the tool 30, comprising "blocks" 31/31a, to rotate about its longitudinal axis 37. An electron beam 44 from electron beam welding machine 45 produces a circumferential weld of the tool 30 "blocks" 31/31a along weld line 27a (analogous to weld line 27 in FIG. 2B) as the tool 30 rotates. However, since access to hole 32 is not available for redrilling after parts 31/31a are welded together, hole 32 cannot be plugged. Therefore, the welding beam 44 cannot penetrate into the hole area 32 but instead must weld around it. To accomplish this, the electron beam 44 intensity varies depending on the desired depth as previously determined by calibration and programmed into computer 46 by computer program 47. For example, at the top of hole 32 (FIG. 3), the beam 44 intensity is reduced so as to weld the tool 30 from its outer diameter to points approaching, but not penetrating into, the hole 32 as shown by the weld lines 38 located between the weld lines 38a and 38b. As the tool rotates to a point such as weld line 38a where the beam 44 does not intersect the hole 32, the intensity of the beam 44 is increased so as to penetrate the tool 30 to a point slightly beyond the axis 37 (center) of the tool 30. Then, as the tool 30 continues to rotate, the increased intensity beam 44 continues to weld the tool 30 to a point just beyond the center 37 until it again approaches the hole 32 at weld line 38b, thus resulting in the variable penetration welding process. Programming of the computer 46 consists of simply determining (measuring) the desired depth of penetration of the electron beam 44 at each angular position around the tool 30 and inputting these measurements into the computer program 47 as is well-known to those skilled in the art. The beam 44 is not required to intersect the center 37 of the tool 30 but may travel in any chord of the cross-section. In this manner, the portion 33 of the surface of section 31 between the hole 32 and the center 37 may also be welded if desired.

Figure 5:
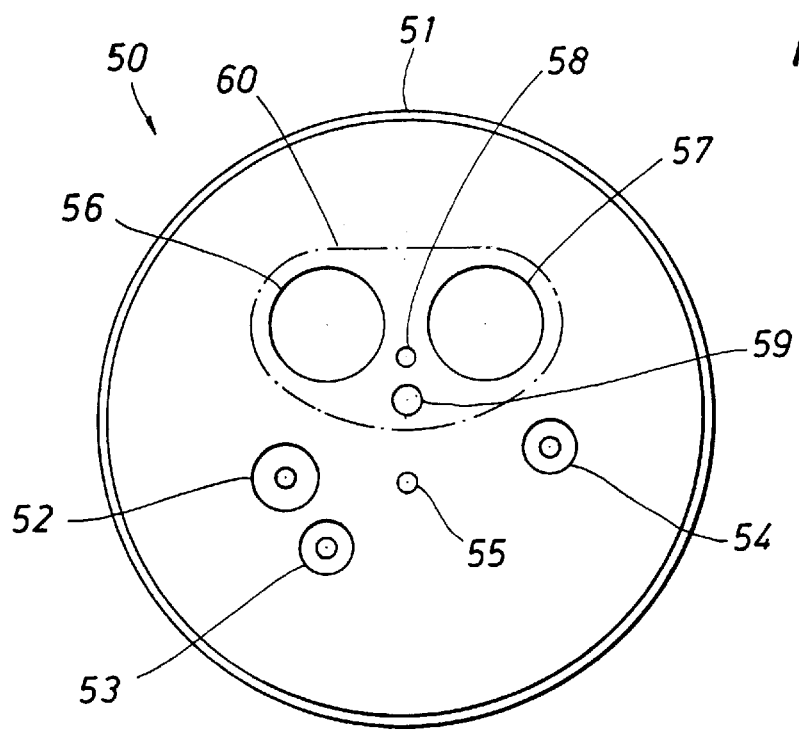
FIG. 5 is a cross-section of a preferred embodiment.

Referring now to FIG. 5, a joint surface 51 of tool 50 includes holes 52, 53, 54 and 55 which must be plugged prior to welding, then drilled out after welding. Also included are holes 56, 57, 58 and 59 which do not require isolation from each other or which may be permanently plugged, i.e., communication between these holes across the interface is not required and, therefore, the plugs do not have to be drilled out after the welding process. In this embodiment, the weld covers the entire surface 51 of the tool 50 except for the portion 60 outlining the holes 56–59. The welding process is analogous to that used in the example of FIG. 3. However, the plugs in holes 52, 53, 54 and 55 must be drilled out after the welding process is completed for communication therethrough.

The welding machine used in the above embodiments was a Sciaky CV.4-300-RC-1TM. This is a typical CNC programmed machine. Other welding machines may be used depending upon the application and are well known to those skilled in the art. Likewise, other acceptable equipment, such as the vacuum chamber and lathe, are well known to those skilled in the art.

After programming the weld configuration, the initial process was calibrated by sectioning and polishing the cross-section of the weld. It is easy to visualize the welded area. Since this process is programmed on a Computer Numerical Controlled machine, it is a matter of saving the initial program which had been qualified and then calling it up again the next time another part is to be welded. Applicant has welded test pieces prior to welding the production part, but this was due more to machine maintenance than to program verification.

Because of the deep and narrow weld 27, 27a, etc. profile, joints must be precisely aligned over the entire length of the weld. Machining and fixture tolerances are quite demanding. In addition, the joint must be free of all contaminants and lubricants. The following precautions should be taken:

Plugs are preferably made of the same base material as the parts being welded and must be cleaned before assembly with either hexane or acetone. Plugs are preferably about ¼ to ⅜-inch long and should be designed to leave a minimum of 0.005-inch and a maximum of 0.025-inch exposed to allow re-surfacing (i.e., machining) of the part's face (except for the alignment plug discussed below) so that the surface will be flat and the plugs flush within 0.001-inch flatness with a surface finish of 63 $\mu$-inch or better. Plugs should be press fit with a minimum of 0.0003 to 0.0008-inch interference fit.

All holes must be cleaned and all lubricants removed using either hexane or acetone. One off-center hole should be designated as the alignment hole. The plug for this hole must press into one side, e.g., into part 21 in FIG. 2B (0.0003-inch interference fit with a maximum of 0.0008-inch) and have a locating fit on the other half of the plug (in part 21a of FIG. 2B) of 0.001 max. under the mating hole diameter making sure to sink the press fit side far enough so as to not interfere with assembly.

Parts are assembled for welding by using an assembly fixture which ensures the ability to position the two parts' outside diameters to within 0.002-inch diametrically. The joint should be tightened, by axial clamping or rams, to produce a seam of minimum clearance.

Tack-welding about the perimeter should leave at least a 0.5-inch gap between welds to allow room for focusing the electron beam. All part faces should be cleaned, prior to assembly, with either hexane or acetone to remove all lubricants.

What is claimed is:

1. A method of welding two metal parts together comprising:

machining a first part by using metal-removal processes;

machining a second part by using metal-removing processes, said first and second parts having interface surfaces designed for joining said parts together, said interface surfaces each having at least one hole drilled therethrough for communicating between said parts;

placing a tightly fitting plug in said at least one hole in each of said parts;

machining said interface surfaces, including said plugs, to a desired finish;

placing said interface surfaces in mating relationship to define an interface, said communication holes being in alignment;

tack-welding said first and second parts together while said parts are in said mating and aligned relationship;

placing said tack-welded first and second parts inside a vacuum chamber;

pulling a vacuum inside said chamber;

positioning an electron beam machine adjacent said interface surfaces;

causing said first and second parts to rotate around their longitudinal axis;

directing an electron beam from said welding machine to said interface while said parts are rotating; and welding said interface surfaces together by setting the intensity of said electron beam according to a preset program of intensity versus beam direction with relation to said interface surfaces, said electron beam extending across said aligned communication holes whereby the welding fully penetrates said holes.

2. The method of claim 1 further including the step of cleaning said first and second parts prior to tack-welding.

3. The method of claim 1 wherein said intensity of said electron beam changes as said parts are rotated.

4. The method of claim 1 further including the step of drilling out said at least one plug in said at least one hole.

5. The method of claim 1 wherein said first and second parts comprise a tool for use in an oil well application.

6. A method of welding two metal parts together comprising:

machining a first part by using metal-removal processes;

machining a second part by using metal-removing processes, said first and second parts having interface surfaces designed for joining said parts together, said interface surfaces each having at least one cavity therethrough for communicating between said parts;

machining said interface surfaces to a desired finish;

placing said interface surfaces in mating relationship to define an interface, said communication cavities being in alignment;

tack-welding said first and second parts together while said parts are in said mating and aligned relationship;

placing said tack-welded first and second parts inside a vacuum chamber;

pulling a vacuum inside said chamber;

positioning an electron beam machine adjacent said interface surfaces;

causing said first and second parts to rotate around their longitudinal axis;

directing an electron beam from said welding machine to said interface while said parts are rotating; and welding said interface surfaces together by setting the intensity of said electron beam according to a preset program of intensity versus beam direction with relation to said interface surfaces.

7. The method of claim 6 further including the step of cleaning said first and second parts prior to tack-welding.

8. The method of claim 6 wherein said intensity of said electron beam changes as said parts are rotated.

9. The method of claim 6 wherein said first and second parts comprise a tool for use in an oil well application.

10. A method of welding two metal parts together comprising:

machining a first part by using metal-removal processes;

machining a second part by using metal-removing processes, said first and second parts having interface surfaces designed for joining said parts together, said interface surfaces each having at least one hole drilled therethrough for communicating between said parts;

placing a tightly fitting plug in said at least one hole in each of said parts;

machining said interface surfaces, including said plugs, to a desired finish;

placing said interface surfaces in mating relationship to define an interface, said communication holes being in alignment;

placing said tack-welded first and second parts inside a vacuum chamber;

pulling a vacuum inside said chamber;

positioning an electron beam machine adjacent said interface surfaces;

causing said first and second parts to rotate around their longitudinal axis;

directing an electron beam from said welding machine to said interface while said parts are rotating; and welding said interface surfaces together by setting the intensity of said electron beam according to a preset program of intensity versus beam direction with relation to said interface surfaces, said electron beam extending across said aligned communication holes whereby the welding fully penetrates said holes.

11. The method of claim 10 further including the step of tack-welding said first and second parts together while said parts are in said mating and aligned relationship.

12. The method of claim 11 further including the step of cleaning said first and second parts prior to tack-welding.

13. The method of claim 10 wherein said intensity of said electron beam changes as said parts are rotated.

14. The method of claim 10 further including the step of drilling out said at least one plug in said at least one hole.

15. The method of claim 10 wherein said first and second parts comprise a tool for use in an oil well application.

* * * * *

UNITED STATES PATENT AND TRADEMARK OFFICE
CERTIFICATE OF CORRECTION

PATENT NO.   : 5,977,509
DATED        : November 2, 1999
INVENTOR(S)  : John Carey Ratcliff It is certified that error appears in the above-identified patent and that said Letters Patent is hereby corrected as shown below:

<u>Title page, Item [54] and Column 1, line 2,</u>
Title, "DOWNHOLD" should read -- DOWNHOLE --

<u>Column 8,</u>
Line 8, "tack-welded" should read -- aligned --

Signed and Sealed this

Eighth Day of July, 2003

JAMES E. ROGAN
*Director of the United States Patent and Trademark Office*